US010158546B2

(12) United States Patent
Geetha Gopalakrishnan (10) Patent No.: US 10,158,546 B2
(45) Date of Patent: Dec. 18, 2018

(54) SYSTEM AND METHOD FOR POWER REDUCTION IN NETWORK EQUIPMENT

(71) Applicant: DELL PRODUCTS L.P., Round Rock, TX (US)

(72) Inventor: Raman Geetha Gopalakrishnan, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 120 days.

(21) Appl. No.: 14/135,079

(22) Filed: Dec. 19, 2013

(65) Prior Publication Data

US 2015/0180779 A1    Jun. 25, 2015

(51) Int. Cl.
*H04L 12/24* (2006.01)
*H04L 12/26* (2006.01)
*H04W 52/02* (2009.01)
*H04W 52/34* (2009.01)

(52) U.S. Cl.
CPC ...... *H04L 43/0882* (2013.01); *H04L 41/0833* (2013.01); *H04L 43/16* (2013.01); *H04W 52/343* (2013.01); *H04W 52/0203* (2013.01); *Y02D 70/00* (2018.01); *Y04S 40/162* (2013.01); *Y04S 40/168* (2013.01)

(58) Field of Classification Search
CPC .......................... H04L 47/10; H04L 47/2441
USPC ........................................................ 370/235
See application file for complete search history.

(56) References Cited

U.S. PATENT DOCUMENTS

| 7,702,739 B1 * | 4/2010 | Cheng ................. H04L 47/10 709/203 |
| 2004/0047354 A1 * | 3/2004 | Slater ................. H04L 41/0896 370/400 |
| 2004/0240381 A1 * | 12/2004 | Clark et al. ................ 370/229 |
| 2009/0225653 A1 * | 9/2009 | Kitajima ..................... 370/225 |
| 2010/0214920 A1 * | 8/2010 | Tewani et al. .............. 370/232 |

(Continued)

FOREIGN PATENT DOCUMENTS

WO    WO 2010/144002 A1 * 12/2010

OTHER PUBLICATIONS

Cisco/Intel, "IEEE 802.3az Energy Efficient Ethernet: Build Greener Networks," White Paper, 2011, 9 pages. https://www.cisco.com/en/US/prod/collateral/switches/ps5718/ps4324/white_paper_c11-676336.pdf.

Ilyadis, Nicholas, "Energy Efficient Ethernet Networks," UCI-Broadcom Collaboration, Jan. 12, 2010, 32 pages. http://www/calit2.uci.edu/uploads/Media/Text/Ilyadis_1.pdf.

(Continued)

*Primary Examiner* — Peter G Solinsky
(74) *Attorney, Agent, or Firm* — Haynes and Boone, LLP (57) ABSTRACT

A system and method for power reduction in network equipment includes collecting network traffic statistics for a network segment that includes a plurality of network links between a first node and a second node, determining an amount of network traffic on the network segment based on the first network traffic statistics, determining whether the amount of network traffic is above a first threshold, selecting a first network link from the network links that are shutdown when the amount of network traffic is above the first threshold; directing that the first network link be brought up; determining whether the amount of network traffic is below a second threshold less than the first threshold, selecting a second network link from the network links that are online when the amount of network traffic is below the second threshold, and directing that the second network link be shut down.

18 Claims, 5 Drawing Sheets

(56) References Cited

U.S. PATENT DOCUMENTS

| | | | | |
|---|---|---|---|---|
| 2011/0211585 A1* | 9/2011 | Kodaka | .................. | H04L 45/00 370/401 |
| 2011/0255442 A1* | 10/2011 | Wang et al. | .................. | 370/254 |
| 2011/0276636 A1* | 11/2011 | Cheng | .................... | H04L 69/18 709/206 |
| 2011/0317543 A1* | 12/2011 | Medina et al. | ............... | 370/216 |
| 2013/0108263 A1* | 5/2013 | Srinivas | ............... | H04Q 3/0083 398/45 |
| 2013/0163427 A1* | 6/2013 | Beliveau et al. | ............. | 370/235 |
| 2013/0238773 A1* | 9/2013 | Kondapalli | ......... | H04L 41/0813 709/223 |
| 2013/0332762 A1* | 12/2013 | Meirosu | .................. | H04L 12/12 713/323 |
| 2014/0298052 A1* | 10/2014 | Meirosu | ............. | H04L 41/0833 713/320 |
| 2015/0063206 A1* | 3/2015 | Kneckt | ................ | H04W 16/14 370/328 |
| 2015/0124948 A1* | 5/2015 | Shridhar | ............... | H04L 5/0055 379/93.08 |
| 2016/0212056 A1* | 7/2016 | Grosso | ............... | H04L 43/0894 |

OTHER PUBLICATIONS

Broadcom, "Energy Efficient Networking," Product Portfolio, http://www.broadcom.com/products/features/energy_efficient_network.php , retrieved Oct. 23, 2013, 3 pages.

* cited by examiner

SYSTEM AND METHOD FOR POWER REDUCTION IN NETWORK EQUIPMENT

BACKGROUND

The present disclosure relates generally to information handling systems, and more particularly to power reduction in network equipment.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often used to implement the interconnection fabric. This can be further complicated through other networking trends such as parallelization.

Many networks utilize parallelization and other techniques to improve the forwarding function between two network nodes. By employing parallelization, redundancy is built into a network so that it is possible that more than one path exists between any two nodes. This provides suitably aware network switching products with the ability to select between the redundant paths to avoid network congestion, balance network loads, or to avoid failures in the network. Parallelization also provides the ability to handle more network traffic between two nodes than is possible when parallelization is not utilized. In some implementations the parallelization is treated in a more formalized fashion in the form of a link aggregation group (LAG) which may bundle multiple network links between two nodes.

Network switching products typically operate at high clock speeds and, as a consequence, tend to consume large amounts of power. As more power is consumed by the network switching products, the cost of operating the information handling systems and the computer networks that use the network switching products increases. The large power consumption also introduces secondary costs to operate the information handling systems and network switching products. The high power consumption typically results in significant heat being generated that should be removed from the rooms housing the information handling systems and network switching devices. This adds to cooling costs. Further, when the heat is not fully removed, the network switching products operate at higher temperature, which tends to decrease the lifetime of each of the network switching products, further adding to the operating costs as the devices are replaced more frequently.

As a result, investment is currently being made to reduce power consumption by network switching products. For example, the IEEE 802.3az standard for energy efficient Ethernet reduces power consumption in individual ports of network switching devices and corresponding network links by defining a low power idle signal that is transmitted between network packets. Other approaches recommend shutting down ports when another device is not connected to the network link on the port or even changing power transmission levels based on the lengths of cables in network links. Further power reduction gains are possible.

Accordingly, it would be desirable to provide improved network switching products that can reduce power consumption.

SUMMARY

According to one embodiment, a method of managing power in a network includes collecting first network traffic statistics for a network segment between a first node and second node, the network segment including a plurality of network links between the first node and the second node; determining an amount of network traffic on the network segment based on the collected first network traffic statistics; determining whether the amount of network traffic on the network segment is above a first threshold; selecting a first network link from the plurality of network links that are shutdown when the amount of network traffic on the network segment is above the first threshold; directing that the first network link be brought up; determining whether the amount of network traffic on the network segment is below a second threshold, the second threshold being below the first threshold; selecting a second network link from the plurality of network links that are online when the amount of network traffic on the network segment is below the second threshold; and directing that the second network link be shut down.

According to another embodiment, a method of managing power in a network includes collecting first network traffic statistics for a plurality of network segments, collecting second network traffic statistics for a plurality of flows being transmitted using the network, selecting a first network segment from the plurality of network segments based on the collected first and second network traffic statistics, directing that the first network segment be shut down, selecting a second network segment from the plurality of network segments based on the collected first and second network traffic statistics, and directing that the second network segment be brought up. The plurality of network segments couples together a plurality of nodes to form the network;

According to yet another embodiment, an information handling system includes a network controller. The network controller includes a control unit with one or more processors, a memory coupled to the control unit and storing a plurality of machine-readable instructions for execution by the one or more processors, and one or more ports coupled to the control unit and configured to couple the network controller to a network. The network includes a plurality of nodes coupled together using a plurality of network segments. The network controller is configured to collect first network traffic statistics for a plurality of network segments, collect second network traffic statistics for a plurality of flows being transmitted using the network, select a first network segment from the plurality of network segments based on the collected first and second network traffic statistics, direct that the first network segment be shut down, select a second network segment from the plurality of network segments based on the collected first and second network traffic statistics, and direct that the second network segment be brought up. The plurality of network segments couples together a plurality of nodes to form the network.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
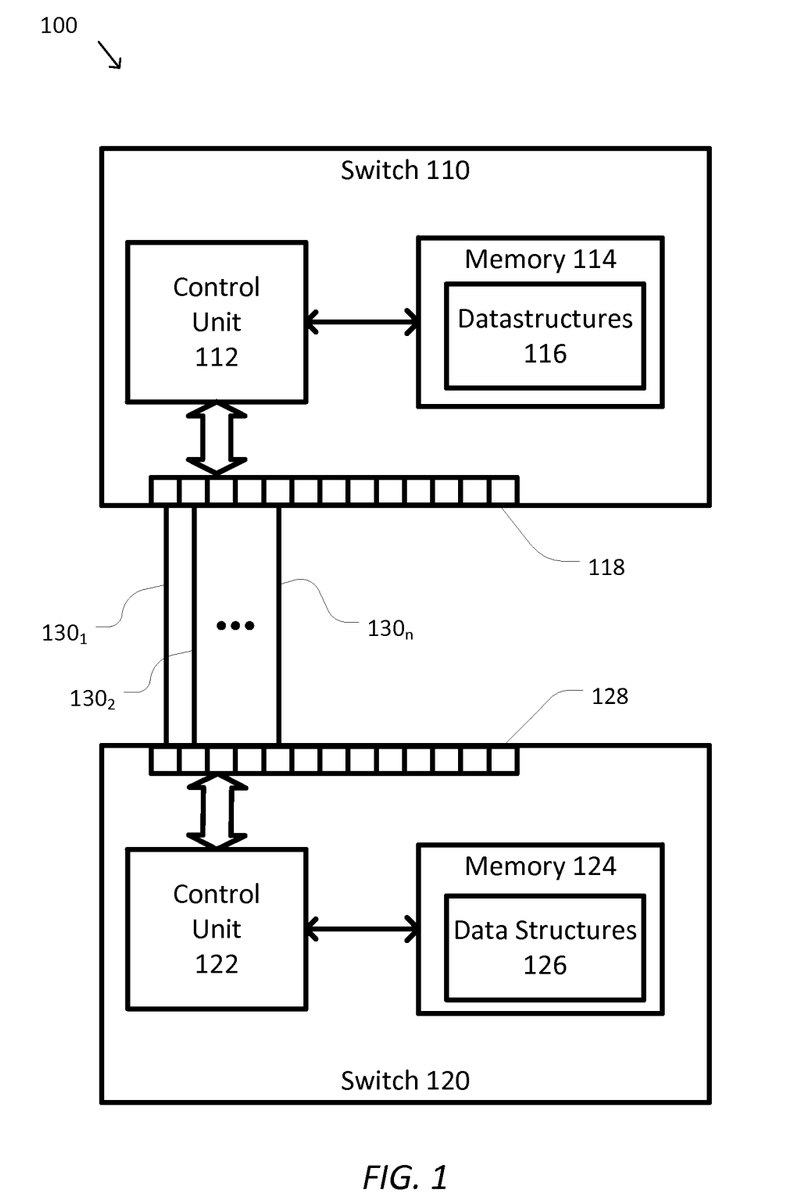
FIG. 1 shows a simplified diagram of a network according to some embodiments.

FIG. 1 shows a simplified diagram of a network 100 according to some embodiments. As shown in FIG. 1, network 100 may include network switching devices or switches 110 and 120. And although only two switches are shown in network 100, it would be understood that network 100 may include any number of switches. As shown, switches 110 and 120 respectfully include a control unit 112 and 122 and a memory 114 and 124. Control unit 112 is coupled to memory 114 and may control the operation of switch 110, and control unit 122 is coupled to memory 124 and may control the operation of switch 120. In some examples, the control units 112 and 122 may be used to make forwarding decisions for network traffic being handled by switches 110 and 120, respectively, as well as to handle other management responsibilities for switches 110 and 120, respectively. In some examples, the control units 112 and 122 may each include one or more central processing units, processors, microprocessors, microcontroller, application specific integrated circuits (ASICs), field programmable gate arrays (FPGAs), and/or the like.

Memories 114 and 124 are each used to store one or more data structures 116 and 126, respectively. Control units 112 and 122 may maintain and/or update the one or more data structures 116 and 126, respectively. In some examples, the one or more data structures 116 and/or 126 may include virtual LAN (VLAN) tables, media access control (MAC) tables, layer 3(L3) tables, layer 3 forwarding information bases, access control lists (ACLs), flow processing (FP) tables, and/or the like. In some examples, the one or more data structures 116 and/or 126 may be updated based on flow control messages received from a network controller, such as a software defined networking (SDN) controller or OpenFlow controller coupled to the switches 110 and/or 120. The memories 114 and 124 may each include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Switch 110 further includes one or more ports 118 for coupling switch 110 to other switches and/or network devices using network links. Similarly, switch 120 further includes one or more ports 128 for coupling switch 120 to other switches and/or network devices using network links. In some examples, the control units 112 and 122 may use one or more protocols to communicate with the other switches and network devices. As shown in FIG. 1, switches 110 and 120 are coupled to each other using one or more network links $130_1$-$130_n$ to form a network segment of a larger network of which switches 110 and 120 belong. Each of the network links $130_1$-$130_n$ couple one of the ports 118 to one of the ports 128. Network traffic between switches 110 and 120 may use any of the network links $130_1$-$130_n$. In some examples, a hashing strategy may be used to select which of the network links $130_1$-$130_n$ on which to route a network packet between switches 110 and 120. In some examples, the network links $130_1$-$130_n$ may belong to a link aggregation group (LAG).

Figure 2:
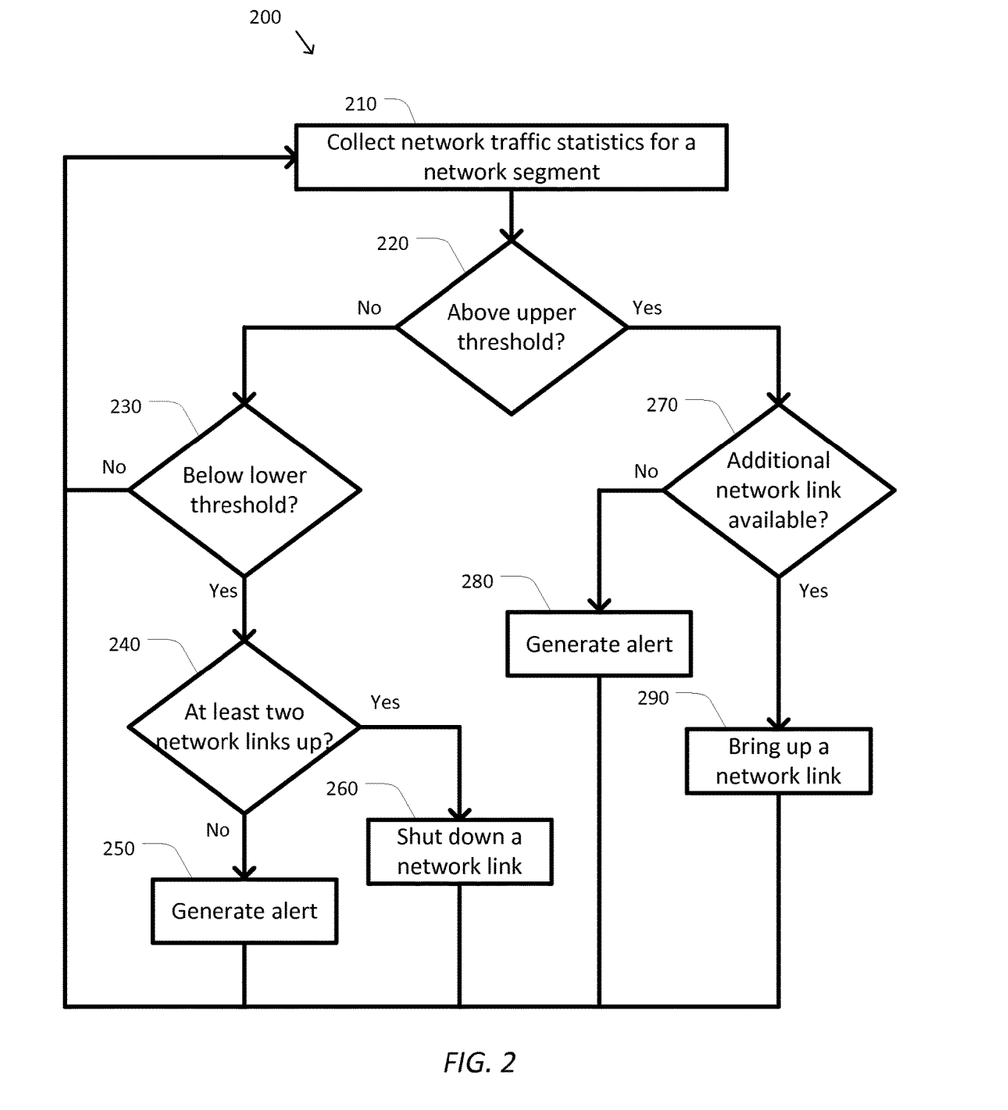
FIG. 2 is a simplified diagram of a method of power management in a network segment according to some embodiments.

FIG. 2 is a simplified diagram of a method 200 of power management in a network segment according to some embodiments. In some embodiments, one or more of the processes 210-290 of method 200 may be implemented, at least in part, in the form of executable code stored on non-transient, tangible, machine readable media that when run by one or more processors (e.g., the one or more processors of control unit 112 and/or 122 or one or more processors associated with a network controller) may cause the one or more processors to perform one or more of the processes 210-290. In some embodiments, method 200 may be performed in a switch, such as any of the switches 110 and/or 120 or in a network controller, such as a SDN controller. According to some embodiments, one or more of the processes 250 and/or 290 are optional and may be omitted.

At a process 210, network traffic statistics for a network segment are collected. As network traffic is forwarded back and forth along a network segment between two switches, various metrics and/or statistics may be collected regarding that network traffic. In some examples, the network segment may be the network segment between switches 110 and 120, that includes network links $130_1$-$130_n$. In some examples, the control units in the switches at both ends of the network segment may collect the network traffic statistics. In some examples, the control units may forward the collected network traffic statistics to a network controller, such as a SDN controller.

According to some embodiments, the network traffic statistics may be collected over a known time interval. Collecting the network traffic statistics over the time interval may be more likely to provide a fuller picture of the network traffic load on the network segment than a measure of the instantaneous network traffic load. In some examples, short duration spikes in the amount of network traffic on a network segment may generally be handled by buffering in the switches at the two ends of the network segment.

In some examples, either or both of the control units may count a number of bytes transmitted over the network segment during the time interval to determine an amount of network traffic transmitted over the network segment. In some examples, the time interval may vary in length from 100 ms to 10 seconds or longer. In some examples, the network traffic statistics may be collected over successive time intervals. In some examples, network traffic statistics may be aggregated over two or more time intervals. In some examples, exponential smoothing or a similar approach may be used to place greater emphasis on network traffic statistics collected over more recent time intervals. In some examples, the network traffic statistics may be normalized based on the length of the time interval so that, for example, the network traffic statistics may measure bytes per second.

In some examples, a first amount of network traffic in a first direction along the network segment may be different from a second amount network traffic in a second direction, opposite the first direction, along the network segment. In some examples, the amount of network traffic for the network segment may be the larger of the first amount of network traffic and the second amount of network traffic.

At a process 220, it is determined whether the amount of traffic is above an upper threshold. The amount of network traffic determined during process 210 is compared to the upper threshold to determine whether the amount of network traffic is greater than a preferred amount. In some embodiments, the upper threshold may be smaller than the maximum amount of network traffic the network segment may support. This may allow method 200 to make adjustments in the network segment before the network segment is overloaded. In some examples, the upper threshold may be set to a percentage of the maximum amount of network traffic that may be supported. In some examples, the percentage may be 80%. When the amount of network traffic is at or below the upper threshold, method 200 continues at a process 230. When the amount of network traffic is above the upper threshold, method 200 continues at a process 270.

At the process 230, it is determined whether the amount of traffic is below a lower threshold. The amount of network traffic determined during process 210 is compared to the lower threshold to determine whether the amount of network traffic is less than a preferred amount. The lower threshold is smaller than the upper threshold. When the amount of network traffic is at or above the lower threshold, method 200 returns to process 210 where additional network traffic statistics are collected. When the amount of network traffic is below the lower threshold, method 200 continues at a process 240.

According to some embodiments, the relationship between the upper threshold and the lower threshold may be controlled to avoid excess thrashing where network links are constantly being shut down only to be shortly brought back up again and/or brought back up only to be shortly shut down again. In some examples, the upper threshold and the lower threshold may be designed to provide hysteresis. In some examples, when each of the network links in the network segment has a same network traffic capacity, the lower threshold should be smaller than $(n-1)/n$ of the upper threshold, where n is the number of network links currently up in the segment. In some examples, the upper and/or lower thresholds may be adjusted as the number of network links that are up changes.

At the process 240, it is determined whether there are at least two links that are up on the network segment. When the amount of network traffic is below the lower threshold this indicates that the network traffic on the network segment is under-utilizing the resources of the network segment. When at least two network links in the network segment are up and/or online this means the network segment is currently using at least one network link that may not be needed. When this happens, a network link is shut down using a process 260. When the network segment includes only one network link that is up, an alert may be generated using a process 250.

At the optional process 250, an alert may be generated. When the amount of network traffic on the network segment is below the lower threshold using one network link, it may be appropriate to generate an alert indicating the low usage for the network segment. In some examples, the alert may be sent to a user and/or an operator. In some examples, the alert may be sent to a log. After the alert is generated, additional network traffic statistics may be collected using process 210.

At the process 260, a network link is shut down. When the amount of network traffic is below the lower threshold, power may be conserved in the network segment by shutting down one of the network links in the network segment. This is possible because the other network links in the network segment that remain up are able to handle the network traffic previously handled by the network link that is being shut down. In some embodiments, one of the switches at the ends of the network segment may exchange messages with the other switch at the other end of the network segment to select the network link to shut down and then shut the network link down. In some embodiments, the network controller performing method 200 may select the network link to shut down and then send one or more corresponding flow control and/or other messages to the two switches at the ends of the network.

In some embodiments, being able to shut down a network link in a network segment may rely on an adaptable hashing mechanism for the network segment that allows a network link to be removed from consideration by the hashing mechanism while still providing a fair balancing of network traffic among the network links that remain up. After the network link is shut down, additional network traffic statistics may be collected using process 210.

At the process 270, it is determined whether an additional network link is available in the network segment. When the amount of network traffic on the network segment is above the upper threshold, it would be helpful to add an additional link to the network segment. In some examples, this may be possible when the network segment includes at least one network link that is shut down. When an additional network link is not available, an alert may be generated using a process 280. When an additional network link is available, it is brought up using a process 290.

At the optional process 280, an alert may be generated. When the amount of network traffic on the network segment is above the threshold and the network segment does not include any network links that are currently shut down, this means that the network segment is reaching the maximum amount of network traffic that it may handle. The alert may be generated and sent to provide a warning that the network segment is reaching its maximum capacity. In some examples, the alert may be sent to a user and/or an operator. In some examples, the alert may be sent to a log. In some examples, the alert may be used to determine that one or more network paths may be rerouted around the network segment. After the alert is generated, additional network traffic statistics may be collected using process 210.

At the process 290, a network link is brought up. When the network segment is handling a large amount of network traffic and an additional network link in the network segment is currently shut down, it may be possible to reduce the risk of overloading the network segment by bringing the additional network link up so that it becomes online and able to handle network traffic. In some embodiments, one of the switches at the ends of the network segment may exchange messages with the other switch at the other end of the network segment to select the network link that is shut down and then bring the network link up. In some embodiments, the network controller performing method 200 may select the network link to bring up and then send one or more corresponding flow control and/or other messages to the two switches at the ends of the network link instructing the two switches to bring the network link up.

In some embodiments, being able to bring up a previously shut down network link in a network segment may rely on an adaptable hashing mechanism for the network segment that allows a network link to be added to consideration by the hashing mechanism while still providing a fair balancing of network traffic among the network links that are now up. After the network link is brought up, additional network traffic statistics may be collected using process 210.

Figure 3:
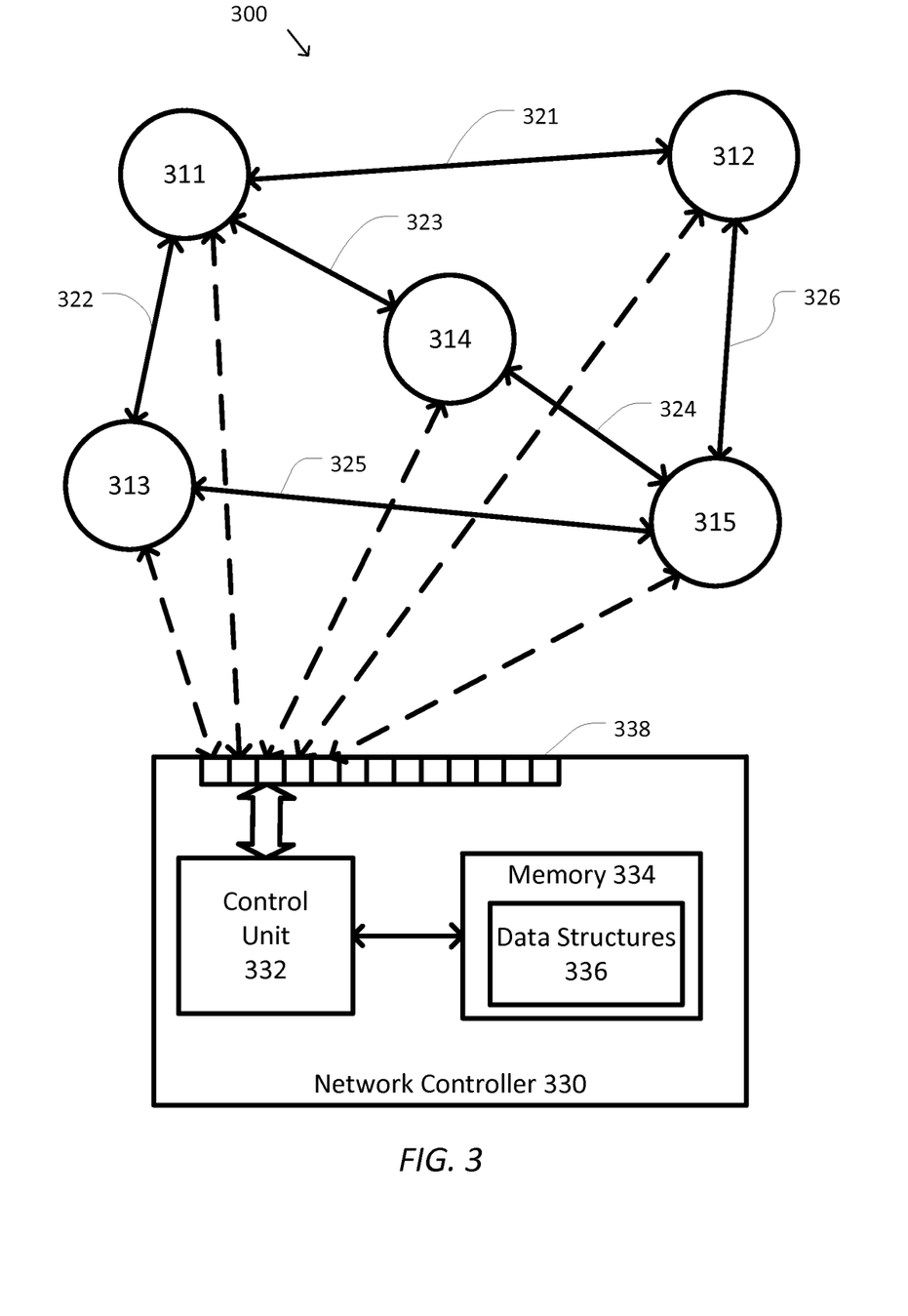
FIG. 3 shows a simplified diagram of a network according to some embodiments.

FIG. 3 shows a simplified diagram of a network 300 according to some embodiments. As shown in FIG. 3, network 300 may include several nodes 311-315. In some examples, network 300 may be a sub-network of a larger network. In some examples, network 300 may be an autonomous system. In some embodiments, each of the nodes may be a network switching device, a switch, a bridge, a router, and/or the like. In some examples, any of the nodes 311-315 may be switch 110 and/or switch 120. And although only five nodes are shown in network 300, it would be understood that network 300 may include any number of nodes.

As further shown, the nodes 311-315 are coupled using various network segments 321-326. Each of the network segments may include one or more network links in a configuration that may be similar to the arrangement of network links $130_1$-$130_n$ between switches 110 and 120. As shown in FIG. 3, node 311 is coupled to node 312 using network segment 321, node 311 is coupled to node 313 using network segment 322, node 311 is coupled to node 314 using network segment 323, node 314 is coupled to node 315 using network segment 324, node 313 is coupled to node 315 using network segment 325, and node 315 is coupled to node 312 using network segment 326. The network segments 321-326 may be used to provide various paths through network 300 so that network traffic may be routed from any of the nodes 311-315 to any other of the nodes 311-315. Although not shown in FIG. 3, network 300 may also have additional network segments coupling network 300 to other networks.

Network 300 is being managed by a network controller 330. In some embodiments network controller 330 may be a SDN controller and/or an OpenFlow controller. Network controller 330 includes a control unit 332 and a memory 334. Control unit 332 is coupled to memory 334 and may control the operation of network controller 330. In some examples, control unit 330 may be used to handle management responsibilities for both network controller 330 as well as nodes 311-315. In some examples, control unit 332 may include one or more central processing units, processors, microprocessors, microcontroller, application specific integrated circuits (ASICs), field programmable gate arrays (FPGAs), and/or the like.

Memory 334 is used to store one or more data structures 336. Control unit 332 may maintain and/or update the one or more data structures 336. In some examples, the one or more data structures 336 may include management tables that may be used by network controller 330 and/or control unit 332 to store information regarding the configuration of other devices in network 300, such as nodes 311-315. In some examples, the management tables may include provisioning information for the other devices. In some examples, the management tables may be implemented using data structures other than tables and/or using databases. Memory 334 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Network controller 330 further includes one or more ports 338 for coupling network controller 330 to other network devices using network segments and/or network links. For example, network controller 330 may be coupled directly and/or indirectly to nodes 311-315 as shown by the dashed network links. In some examples, the control unit 332 may use one or more protocols to communicate with nodes 311-315. During operation, network controller 330 may exchange one or more messages with nodes 311-315 to monitor and/or control the operation of nodes 311-315, network segments 321-326, and/or network 300. In some examples, network controller 330 may receive network traffic statistics for each of the network segments 321-326.

In some embodiments, network controller may be responsible for monitoring network traffic in network 300 and control which of the network segments 321-326 may be used to carry network traffic associated with one or more flows. In some examples, by controlling which of the network segments 321-326 to include in a path through the network, network controller 330 may be able to better manage power consumption in network 330. In some examples, network controller 330 may shut down and/or bring up one or more of the network segments 321-326 based on the amount of network traffic between nodes 311-315 in network 300. In some embodiments, network controller 330 may use the network traffic statistics to configure one or more paths through network 300 that include one or more of the network segments 321-326. In some examples, network controller 330 may transmit one or more flow control and/or other messages to nodes 311-315 that may configure the one or more paths and/or reroute the one or more paths so that the paths include different combinations of the network segments 321-326. In some embodiments, network controller 330 may use method 200 to manage the number of network links that are up and/or shutdown in each of the network segments 321-326.

Figure 4:
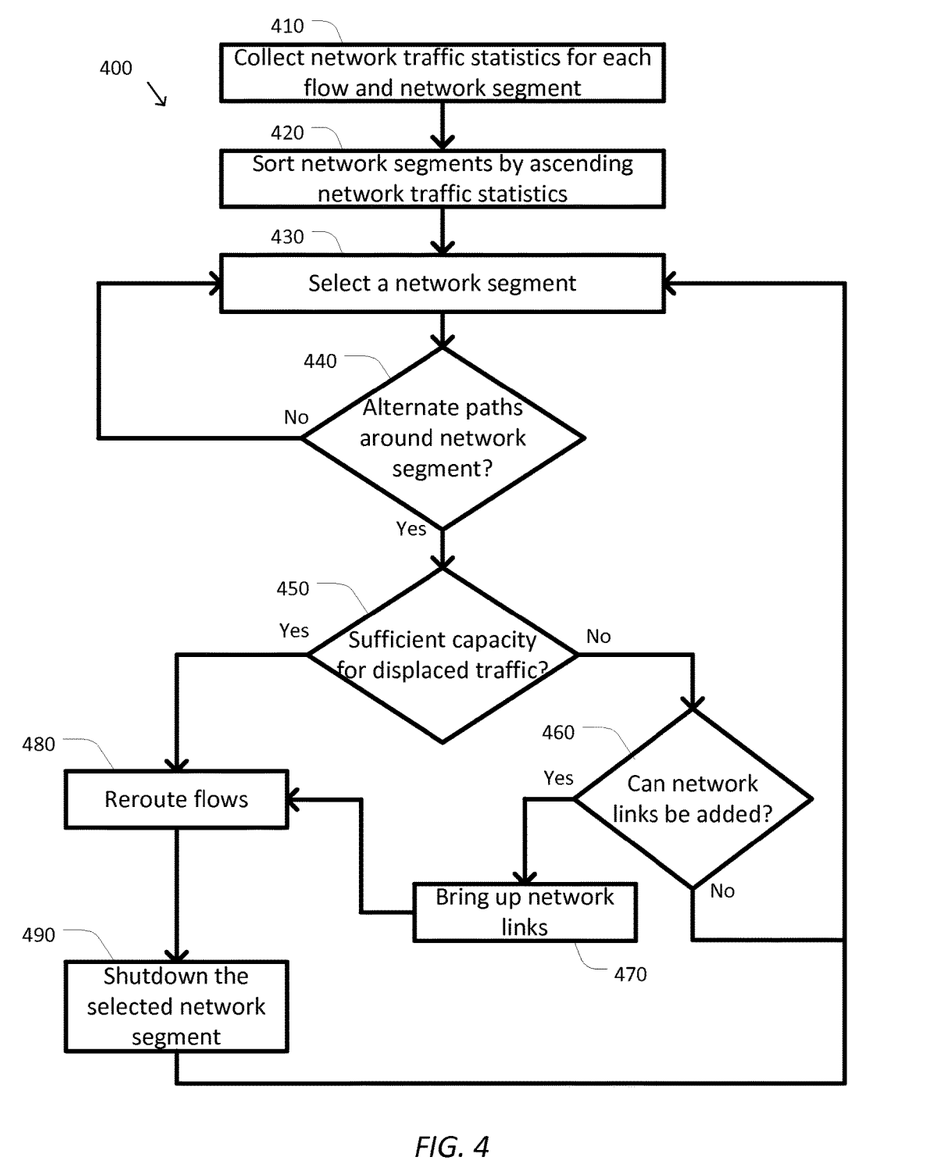
FIG. 4 is a simplified diagram of a method of power management in a network according to some embodiments.

FIG. 4 is a simplified diagram of a method 400 of power management in a network according to some embodiments. In some embodiments, one or more of the processes 410-490 of method 400 may be implemented, at least in part, in the form of executable code stored on non-transient, tangible, machine readable media that when run by one or more processors (e.g., the one or more processors 332) may cause the one or more processors to perform one or more of the processes 410-490. In some embodiments, method 400 may be performed in a network controller, such as network controller 330. In some embodiments, method 400 may be used to reduce power consumption in a network by shutting down one or more of the network segments and rerouting network traffic around the network segments that have been shut down. According to some embodiments, one or more of the processes 460 and/or 470 are optional and may be omitted.

At a process 410, network traffic statistics for each flow and network segment are collected. As network traffic is forwarded back and forth along the network segments of a network, various metrics and/or statistics may be collected regarding that network traffic. In some examples, the network traffic may be collected separately for each flow and/or path through the network and/or for each network segment in the network. In some examples, either of the nodes at each end of the network segments may collect the network traffic statistics for each flow using the network segment and/or for the network segment as a whole. In some examples, the nodes may forward the collected network traffic statistics to a network controller. In some examples, the network may be the network 300 and the network controller may be network controller 330 with network traffic statistics being collected for each of the flows in network 300 and for each of the network segments 321-326.

According to some embodiments, the network traffic statistics may be collected over a known time interval. Collecting the network traffic statistics over the time interval may be more likely to provide a fuller picture of the network traffic load for each of the flows and/or for each of the network segments than a measure of the instantaneous network traffic load. In some examples, short duration spikes in the amount of network traffic within a flow and/or on a network segment may generally be handled by buffering in the nodes at the two ends of each of the network segments.

In some examples, the network traffic statistics may include a count of a number of bytes transmitted over each network segment and/or within each flow during the time interval to determine an amount of network traffic transmitted over each of the network segments and/or within each flow. In some examples, the time interval may vary in length from 100 ms to 10 seconds or longer. In some examples, the network traffic statistics may be collected over successive time intervals. In some examples, network traffic statistics may be aggregated over two or more time intervals. In some examples, exponential smoothing or a similar approach may be used to place greater emphasis on network traffic statistics collected over more recent time intervals. In some examples, the network traffic statistics may be normalized based on the length of the time interval so that, for example, the network traffic statistics may measure bytes per second.

In some examples, a first amount of network traffic in a first direction along any of the network segments and/or within any of the flows may be different from a second amount network traffic in a second direction, opposite the first direction. In some examples, the amount of network traffic may be the larger of the first amount of network traffic and the second amount of network traffic.

At a process 420, the network segments are sorted based on ascending network traffic statistics. In general, the best candidates for a network segment that may be shut down in a network without overloading any of the other network segments may be those network segments with the lowest amount of network traffic. In some examples, the network segments with the lowest amount of network traffic may be more easily accommodated by the other network segments in the network. By sorting the network segments in ascending order by their respective network traffic statistics, the network segments with the lower amounts of network traffic may be more easily determined.

At a process 430, a network segment is selected. The network segment is selected as a potential network segment that may be shut down, thus reducing the power used to maintain that network segment. Power reduction may be possible when the other network segments in the network may support the network traffic previously being handled by the shutdown network segment so that fewer network segments are being used to handle the same level of network traffic. Using the sorted network segments from process 420, the network segment may be selected as the network segment with the lowest amount of network traffic that has not been previously selected since network traffic statistics were collected using process 410. Although not shown in FIG. 4, when there are no additional network segments to select, additional network traffic statistics may be collected using process 410.

At a process 440, it is determined whether alternate paths around the selected network segment exist. Before the selected network segment may be shut down, alternate paths for each of the flows using the selected network segment should be present in the network. In some examples, when the selected network segment is the only network segment coupling a node and/or a portion of the network to the rest of the network, flows that use that network segment do not have any alternate paths. In some examples, when some of the network segments in the network have been previously shut down, fewer alternate paths may be available for rerouting of the flows.

Consider, for example, the network 300 of FIG. 3. Under the assumption that network segment 323 is the selected network segment and network segment 323 is carrying network traffic for a first flow between node 311 and node 314 and a second flow between node 311 and 315 (through node 314). Alternate paths exist around network segment 323. For example, the first flow may be rerouted along network segment 322 to node 313 then along network segment 325 to node 315 and then along network segment 324 to node 314. Additionally, the second flow may be rerouted along network segment 321 to node 312 and then along network segment 326 to node 315.

When alternate paths around the selected network segment do not exist, another network segment is selected using process 430. When alternate paths around the selected network segment exist, the selected network segment is further processed beginning with a process 450.

At a process 450, it is determined whether the rest of the network has sufficient capacity for the displaced network traffic. Before the selected network segment may be shut down, the network traffic for each of the flows using the selected network segment should be rerouted to other network segments in the network. Each of network segments taking on the displaced network traffic is examined to determine whether those network segments have sufficient capacity for the displaced network traffic. In some examples, the amount of network traffic that is displaced to each of the network segments is added to the amount of network traffic on the respective network segment to check whether that would bring the total amount of network traffic for that network segment about the respective upper threshold for that network segment.

Returning to the example of network 300 from FIG. 3 as discussed above with respect to process 440. During process 450 it is determined whether the alternate paths identified during process 440 may support the displaced network traffic. For example, each of the network segments 322, 325, and 324 should be able to handle the network traffic from the first flow as well as any other network traffic associated with other flows they are handling. Similarly, network segments 321 and 326 should be able to handle the network traffic from the second flow as well as any other network traffic associated with other flows they are handling. When the network segments 321, 322, 324, 325, and 326 can handle the displaced traffic then there is sufficient network capacity to shut down network segment 323.

When there is sufficient capacity in the rest of the network to handle the displaced network traffic, the selected network segment may be shut down beginning with a process 480. When there is insufficient capacity in the rest of the network to handle the displaced network traffic, the selected network segment is further processed beginning with a process 460.

At the optional process 460, it is determined whether additional network links may be added. When the network includes network segments for which one or more network links have been previously shut down, it may still be possible to shut down the selected network segment when the network segments that failed the capacity test of process 450 include one or more shut down network links. For each of the network segments that failed the capacity test of process 450 it is determined whether shut down network links exist and whether bringing those network links up will provide those network segments with sufficient capacity to handle the displaced network traffic.

Returning to the example of network 300 from FIG. 3 as discussed above with respect to processes 440 and 450. Consider the case where network segment 324 is not able to handle the displaced network traffic from the first flow. When network segment 324 includes a previously shutdown network link and bringing the shutdown network link up would provide network segment 324 with the additional capacity to handle the first flow then it may be appropriate to bring that network link up.

When bringing one or more shutdown network links up would provide sufficient capacity to handle the displaced network traffic, the network links may be brought up using a process 470. When there are insufficient shutdown network links to add capacity in the rest of the network to handle the displaced network traffic, another network segment is selected using process 430.

At the optional process 470, one or more network links are brought up. The shutdown network links identified during process 460 may be brought up so that they become online and operational for handling network traffic. In some embodiments, the network controller may select each of the network links to bring up and then send one or more corresponding flow control and/or other messages to the two nodes at the ends of the respective network link instructing the two nodes to bring the respective network links up.

At the process 480, the flows are rerouted. Once the alternate paths around the selected network segment are determined, the network controller sends one or more flow control and/or other messages to the affected nodes instructing the nodes to use the network segments of the alternate paths to reroute the network traffic of the affected flows.

Returning to the example of network 300 from FIG. 3 as discussed above with respect to processes 440-460. During process 480, the network controller may send flow control messages to nodes 311 and 313 to route network traffic for the first flow using network segment 322. Similarly, the network controller may send flow control messages to: nodes 313 and 315 to route network traffic for the first flow using network segment 325, nodes 315 and 314 to route network traffic for the first flow using network segment 324, nodes 311 and 312 to route network traffic for the second flow using network segment 321, and nodes 312 and 315 to route network traffic for the second flow using network segment 326.

At a process 490, the selected network segment is shutdown. Once the nodes have been sent the one or more flow control and/or other messages to route the affected flows around the selected network segment, the network segment may be shut down by sending additional flow control and/or other messages to the two nodes coupled by the selected network segment. In some examples, the additional one or more flow control and/or other messages may instruct the two nodes to shut down each of the network links that are up in the selected network segment. As a result of shutting down the network links, power consumption in the network may be reduced.

In some embodiments, the flow control, forwarding, and/or routing tables may retain information related to the selected network segment after the selected network segment is shut down. In some examples, the affected nodes may retain the information on the selected network segment so that the network paths using the selected network segment may be either more quickly recovered when the selected network segment is brought back up later and/or to provide backup paths to handle overflow traffic for the rerouted flows.

Figure 5:
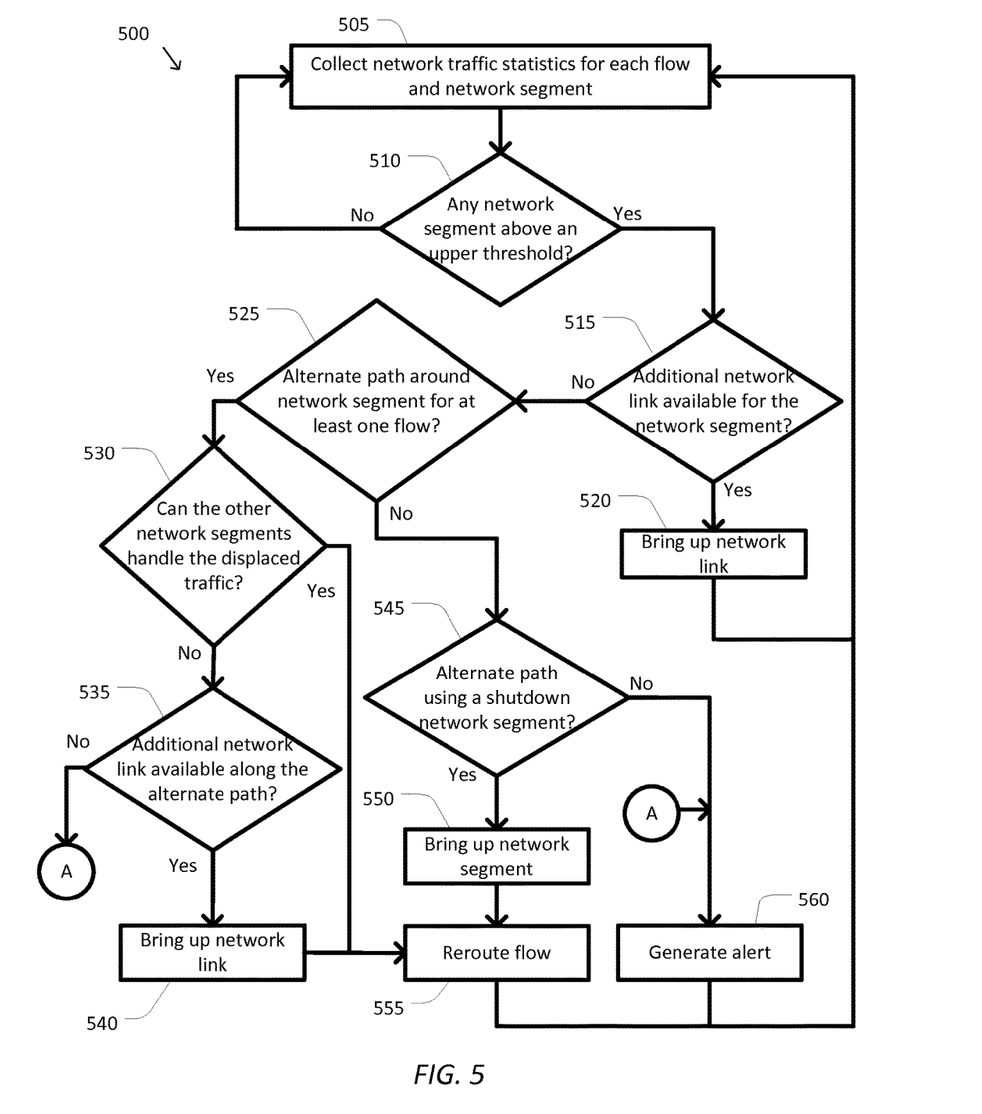
FIG. 5 is a simplified diagram of another method of power management in a network according to some embodiments.

FIG. 5 is a simplified diagram of another method 500 of power management in a network according to some embodiments. In some embodiments, one or more of the processes 505-560 of method 500 may be implemented, at least in part, in the form of executable code stored on non-transient, tangible, machine readable media that when run by one or more processors (e.g., the one or more processors 332) may cause the one or more processors to perform one or more of the processes 505-560. In some embodiments, method 500 may be performed in a network controller, such as network controller 330. In some embodiments, method 500 may be used to reverse power reduction steps in a network by bringing up network links and/or network segments when network traffic levels increase. According to some embodiments, the process 560 is optional and may be omitted.

At a process 505, network traffic statistics for each flow and network segment are collected. As network traffic is forwarded back and forth along the network segments of a network, various metrics and/or statistics may be collected regarding that network traffic. In some examples, the network traffic may be collected separately for each flow and/or path through the network and/or for each network segment in the network. In some examples, either of the nodes at each end of the network segments may collect the network traffic statistics for each flow using the network segment and/or for the network segment as a whole. In some examples, the nodes may forward the collected network traffic statistics to a network controller. In some examples, the network may be the network 300 and the network controller may be network controller 330 with network traffic statistics being collected for each of the flows in network 300 and for each of the network segments 321-326.

According to some embodiments, the network traffic statistics may be collected over a known time interval. Collecting the network traffic statistics over the time interval may be more likely to provide a fuller picture of the network traffic load for each of the flows and/or for each of the network segments than a measure of the instantaneous network traffic load. In some examples, short duration spikes in the amount of network traffic within a flow and/or on a network segment may generally be handled by buffering in the nodes at the two ends of each of the network segments.

In some examples, the network traffic statistics may include a count of a number of bytes transmitted over each network segment and/or within each flow during the time interval to determine an amount of network traffic transmitted over each of the network segments and/or within each flow. In some examples, the time interval may vary in length from 100 ms to 10 seconds or longer. In some examples, the network traffic statistics may be collected over successive time intervals. In some examples, network traffic statistics may be aggregated over two or more time intervals. In some examples, exponential smoothing or a similar approach may be used to place greater emphasis on network traffic statistics collected over more recent time intervals. In some examples, the network traffic statistics may be normalized based on the length of the time interval so that, for example, the network traffic statistics may measure bytes per second.

In some examples, a first amount of network traffic in a first direction along any of the network segments and/or within any of the flows may be different from a second amount network traffic in a second direction, opposite the first direction. In some examples, the amount of network traffic may be the larger of the first amount of network traffic and the second amount of network traffic.

According to some embodiments, processes 410 and 505 may be the same process and the collected network statistics may be shared between methods 400 and 500. In some examples, the network controller may be performing both methods 400 and 500, using method 400 to reduce power consumption when the amount of network traffic lessens and using method 500 to reverse the power reductions when network traffic increases.

At a process 510, it is determined whether the amount of network traffic on any of the network segments is above an upper threshold. The amount of network traffic for each of the network segments determined during process 505 is compared to the upper threshold to determine whether the amount of network traffic is greater than a preferred amount. In some embodiments, the upper threshold may be smaller than the maximum amount of network traffic the respective network segment may support. This may allow method 500 to make adjustments to how network traffic in the network is handled before any of the network segments is overloaded. In some examples, the upper threshold may be set to a percentage of the maximum amount of network traffic that may be supported by the respective network segment. In some examples, the percentage may be 80%. When the amount of network traffic on a network segment is above the upper threshold, method 500 continues at a process 515. When the amount of network traffic on each of the network segments is below the respective upper threshold, network traffic statistics may be collected again using process 505.

At the process 515, it is determined whether an additional network link is available for the network segment. When the amount of network traffic is above the respective upper threshold for one of the network segments, it may be possible to avoid an overload on the network segment by bringing up a currently shutdown network link. When a currently shutdown network link is available on the network segment, it is brought up using a process 520. When the network segment does not have any currently shutdown network links, alternate paths are searched for beginning with a process 525.

At the process 520, a network link is brought up. The shutdown network link identified during process 515 may be brought up so that it becomes online and able to handling network traffic. In some embodiments, the network controller may send one or more corresponding flow control and/or other messages to the two nodes at the ends of the network link/network segment instructing the two nodes to bring the network link up. In some embodiments, once the network link is brought up, additional network traffic statistics are collected using process 505.

At the process 525, it is determined whether an alternate path around the network segment exists for at least one flow using the network segment. When the amount of network traffic is above the respective upper threshold for one of the network segments, it may be possible to avoid an overload on the network segment by routing network traffic for one of the flows using the network segment using a path including other network segments. In some examples, the candidate flow may be selected so as to bring the amount of network traffic on the network segment below the respective upper threshold when the network traffic associated with the candidate flow is removed from the network segment.

Consider, for example, the network 300 of FIG. 3 and the case when network segment 324 is currently carrying network traffic that is above the upper threshold for network segment 324. When network segment 324 is currently carrying network traffic for a candidate flow between nodes 311 and 315, by rerouting the network traffic for the candidate flow using network segments 321 and 326 or network segments 322 and 325, it may be possible to bring the amount of network traffic on network segment 324 below the upper threshold for network segment 324. In this case, there are two alternate paths for the candidate flow.

When alternate paths exist for the candidate flow, the ability of the other network segments to carry the network traffic for the candidate flow is determined using a process 530. When an alternate path does not exist for each of the flows on the network segment, previously shutdown network segments are considered beginning with a process 545.

At the process 530, it is determined whether the other network segments can handle the displaced traffic for the flow. Before the network traffic for the at least one flow is redistributed to other network segments, it is determined whether displacing the network would shift the network traffic overload to the other network segments. Each of network segments taking on the displaced network traffic is examined to determine whether those network segments have sufficient capacity for the displaced network traffic. In some examples, the amount of network traffic that is displaced to each of the network segments is added to the amount of network traffic on the respective network segment to check whether that would bring the total amount of network traffic for that network segment above the respective upper threshold for that network segment.

Returning to the example of network 300 from FIG. 3 as discussed above with respect to process 525. During process 530 it is determined whether the alternate paths identified during process 525 may support the displaced network traffic for the candidate flow. For example, each of the network segments 321 and 326 or 322 and 325, depending on the alternate path being considered for the candidate flow, may be evaluated to determine whether the network segments 321 and 326 or 322 and 325 are able to handle the network traffic from the candidate flow as well as any other network traffic associated with other flows they are handling. When the network segments 321 and 326 or 322 and 325 can handle the displaced traffic then there is sufficient network capacity to redirect the network traffic for the candidate flow using the selected one of those paths.

When there is sufficient capacity in the rest of the network to handle the displaced network traffic for the candidate flow, the candidate flow is rerouted using a process 555. When there is insufficient capacity in the rest of the network to handle the displaced network traffic for the candidate flow, it is determined whether the network segments along the alternate paths have additional capacity in the form of shutdown network links beginning with a process 535.

At the process 535, it is determined whether bringing up one or more additional network links on the alternate path would provide capacity for the displaced network traffic for the candidate flow. When one or more previously shutdown network links are available in one or more of the network segments along an alternate path are available, bringing one or more of these network links up may provide the capacity to handle the displaced network traffic.

Returning to the example of network 300 from FIG. 3 as discussed above with respect to processes 525 and 530. Consider the case where network segments 322 and 325 are being considered as a potential alternate path for the candidate flow between nodes 311 and 315. When network segment 325 has capacity to handle the displaced network traffic for the candidate flow, but network segment does not 322, it may still be possible to redirect the candidate flow using network segments 322 and 325 when network segment 322 has one or more network links that are currently shutdown. If bringing one or more of those network links up would give network segment 322 enough capacity to handle the displaced traffic from the candidate flow, then the alternate path using network segments 322 and 325 may be used for the candidate flow.

When bringing up one or more network links creates a suitable alternate path for the candidate flow, the network links are brought up using a process 540. When bringing up one or more network links does not create a suitable alternate path for the candidate flow, an alert may be generated using a process 560.

At the process 540, a network link is brought up. Each of the one or more shutdown network links identified during process 535 may be brought up so that they become online and able to handling network traffic. In some embodiments, the network controller may send one or more corresponding flow control and/or other messages to the two nodes at the ends of each of the network links/network segments instructing the two nodes to bring the respective network link up. Once each of the network links is brought up, the candidate flow is rerouted using process 555.

At the process 545, it is determined whether an alternate path for the candidate flow may be created by using a currently shutdown network segment. When the network includes one or more network segments that are currently shutdown, it may be possible to create one or more alternate paths for the candidate flow using one of the shutdown network segments.

Returning to the example of network 300 from FIG. 3 as discussed above with respect to processes 525, 530, and 535. Consider the case where network segment 324 is overloaded, network segments 321 and/or 326 cannot handle the displaced network traffic for the candidate flow, and network segment 325 is currently shutdown. If network segment 322 can handle the displaced network traffic for the candidate flow and bringing up network segment 325 provides capacity for the displaced network traffic of the candidate flow, then network segments 322 and 325 may be used as an alternate path for the candidate flow.

When a suitable alternate path for the candidate flow may be formed by bringing up the shutdown network segment, the network segment may be brought up using a process 550. When bringing up a shutdown network segment does not form a suitable alternate path, an alert may be generated using process 560.

At the process 550, a network segment is brought up. At least one of the network links in the shutdown network segment identified during process 545 may be brought up. In some embodiments, the network controller may send one or more corresponding flow control and/or other messages to the two nodes at the ends of each of the network link/network segment instructing the two nodes to bring the respective network link up. Once the network link and the network segment are brought up, the candidate flow is rerouted using process 555.

At the process 555, the candidate flow is rerouted. Once the one or more network links and/or the network segment are brought up during processes 540 and/or 550, the alternate path for the candidate flow is ready for use. The network controller sends one or more flow control and/or other messages to the affected nodes instructing the nodes to use the network segments of the alternate path to reroute the network traffic of the candidate flow. In some embodiments, after the candidate flow is rerouted, additional network traffic statistics are collected using process 505.

At the optional process 560, an alert may be generated. When no suitable alternate path may be found to relieve the overload on a network segment, this means that the network segment is reaching the maximum amount of network traffic that it may handle. The alert may be generated and sent to provide a warning that the network segment is reaching its maximum capacity. In some examples, the alert may be sent to a user and/or an operator. In some examples, the alert may be sent to a log. After the alert is generated, additional network traffic statistics are collected using process 505.

As discussed above and further emphasized here, FIG. 5 is merely an example which should not unduly limit the scope of the claims. One of ordinary skill in the art would recognize many variations, alternatives, and modifications. In some embodiments, many of the processes may be applied to multiple network links, network segments, alternate paths, and/or candidate flows. In some examples, when an overloaded network segment is handling multiple flows, each of the multiple flows may be separately considered as the candidate flow. In some examples, process 555 may be used to reroute multiple candidate flows. In some examples, process 545 may consider alternate paths using multiple shutdown network segments. In some examples, processes 515 and/or 520 may be repeated to bring additional network links up before returning to process 505 after the affect the additional network link brought up during process 520 has on the network traffic statistics for the network segment may be determined.

In some embodiments, other processing may occur before processes 520, 555, and/or 560 returns control to process 505 for the collection of additional network traffic statistics. In some examples, before collecting the additional network statistics, process 510 may be repeated to determine whether any other network segments are currently above a respective upper threshold. When an additional network segments are currently above the respective upper threshold, the detected overload may be addressed before the additional network traffic statistics are collected.

Some embodiments of the switches 110 and/or 120 may include non-transient, tangible, machine readable media that include executable code that when run by one or more processors may cause the one or more processors (e.g., the one or more processors of the control units 112 and/or 122) to perform the processes of method 200. Some embodiments of the network controller 330 may include non-transient, tangible, machine readable media that include executable code that when run by one or more processors may cause the one or more processors (e.g., the one or more processors of the control unit 332) to perform the processes of methods 200, 400, and/or 500. Some common forms of machine readable media that may include the processes of methods 200, 400, and/or 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of managing power in a network, the method comprising:
  collecting first network traffic statistics for a plurality of network segments, each of the plurality of network segments connecting together respective pairs of adjacent nodes from a plurality of nodes that form the network and being configured to carry network traffic for a plurality of flows;
  collecting second network traffic statistics, different from the first network traffic statistics, based on an amount of data transmitted within a flow using the network;
  selecting a first network segment having a lowest amount of network traffic from the plurality of network segments based on the collected first network traffic statistics;
  determining that a respective alternative path exists for each of the plurality of flows that use the first network segment based on the second network traffic statistics;
  directing that the first network segment be shut down; and
  redirecting traffic for each of the plurality of flows that use the first network segment to use the respective alternate path.

2. The method of claim 1, wherein determining that the respective alternate path exists for a first one of the plurality of flows comprises:
  determining whether each of respective one or more second network segments on the respective alternate path has capacity for the first one of the flows based on an amount of network traffic on the respective one of the one or more second network segments and an amount of network traffic associated with the first one of the flows.

3. The method of claim 2, further comprising:
  sending one or more first messages to each node associated with the respective alternate path to direct each node to forward network traffic for the first one of the flows using the respective alternate path; and
  sending one or more second messages to both nodes associated with the first network segment instructing both nodes to shut down each online network link included in the first network segment.

4. The method of claim 2, wherein determining whether each of the one or more second network segments on the respective alternate path has capacity for the first one of the flows comprises determining whether bringing up a shutdown network link of a third network segment on the respective alternate path would provide capacity for the first one of the flows on the third network segment.

5. The method of claim 4, further comprising:
  sending one or more messages to both nodes associated with one of the second network segments instructing both nodes to bring up at least one network link of the one of the second network segments.

6. The method of claim 4, further comprising sending one or more messages to each node associated with the respective alternate path to direct each node to forward network traffic for the first one of the flows using the respective alternate path.

7. The method of claim 1, further comprising generating an alert when no respective alternate path with sufficient capacity is available for a first one of the flows being transmitted on the first network segment.

8. The method of claim 1, wherein the first network traffic statistics and the second network traffic statistics are collected over a time interval.

9. The method of claim 1, wherein each of the first network traffic statistics are collected in a first direction along each respective network segment and in a second direction opposite the first direction along the respective network segment and an amount of network traffic associated with each of the first network traffic statistics is a larger of a first amount of network traffic in the first direction and a second amount of network traffic in the second direction.

10. The method of claim 1, further comprising directing that a second network segment be brought up to provide the respective alternate path for one of the plurality of flows.

11. The method of claim 1, further comprising handling short duration spikes in an amount of network traffic within each network segment by buffering in each node.

12. An information handling system, comprising:
a network controller comprising:
    a control unit comprising one or more processors;
    a memory coupled to the control unit and storing a plurality of machine-readable instructions for execution by the one or more processors; and
    one or more ports coupled to the control unit and configured to couple the network controller to a network comprising a plurality of nodes coupled together using a plurality of network segments;
wherein the network controller is configured to:
    collect first network traffic statistics for a plurality of network segments, each of the plurality of network segments connecting together respective pairs of adjacent nodes from a plurality of nodes that form the network and being configured to carry network traffic for a plurality of flows;
    collect second network traffic statistics, different from the first network traffic statistics, based on an amount of data transmitted within a flow using the network;
    select a first network segment having a lowest amount of network traffic from the plurality of network segments based on the collected first network traffic statistics;
    determine that a respective alternative path exists for each of the plurality of flows that use the first network segment based on the second network traffic statistics;
    direct that the first network segment be shut down; and
    redirect traffic for each of the plurality of flows that use the first network segment to use the respective alternate path;
    wherein each of the network traffic statistics are collected in a first direction and in a second direction opposite the first direction and an amount of network traffic associated with each of the network traffic statistics is a larger of a first amount of network traffic in the first direction and a second amount of network traffic in the second direction.

13. The information handling system of claim 12, wherein the network controller is a software defined networking (SDN) controller.

14. The information handling system of claim 12, wherein the network controller is further configured to receive one or more messages from the plurality of nodes, the one or more messages including data associated with the first network traffic statistics and the second network traffic statistics.

15. The information handling system of claim 12, wherein the network controller is further configured to send one or more messages to both nodes associated with the first network segment instructing both nodes to shut down each online network link included in the first network segment.

16. The information handling system of claim 12, wherein the network controller is further configured to send one or more first messages to both nodes associated with one of one or more second network segments along one of the alternate paths instructing both nodes to bring up at least one network link of the one of the second network segments.

17. The information handling system of claim 12, wherein the network controller is further configured to:
    determine an amount of network traffic on a third network segment based on the collected first network traffic statistics;
    determine whether the amount of network traffic on the third network segment is above a first threshold;
    select a first network link from a first plurality of network links of the third network segment that are shutdown when the amount of network traffic on the third network segment is above the first threshold;
    direct that the first network link be brought up;
    determining whether the amount of network traffic on the third network segment is below a second threshold, the second threshold being below the first threshold; and
    select a second network link from a second plurality of network links of the third network segment that are online when the amount of network traffic on the third network segment is below the second threshold; and
    direct that the second network link be shut down;
    wherein the first threshold and the second threshold are determined based on a number of network links of the plurality of network links that are online.

18. The information handling system of claim 12, wherein each of the nodes are selected from a group consisting of a network switching device, a switch, a bridge, and a router.

* * * * *